(12) United States Patent
Kralj

(10) Patent No.: US 8,368,522 B1
(45) Date of Patent: Feb. 5, 2013

(54) CAR ALERT DEVICE

(76) Inventor: Ivica Kralj, Oshawa (CA)

( * ) Notice: Subject to any disclaimer, the term of this patent is extended or adjusted under 35 U.S.C. 154(b) by 461 days.

(21) Appl. No.: 12/691,404

(22) Filed: Jan. 21, 2010

(51) Int. Cl.
*B60R 25/10* (2006.01)

(52) U.S. Cl. ........... 340/426.2; 340/426.18; 340/426.21; 340/426.25

(58) Field of Classification Search ............... 340/426.2, 340/426.18, 426.21, 426.25
See application file for complete search history.

(56) References Cited

U.S. PATENT DOCUMENTS

| | | | |
|---|---|---|---|
| 5,739,748 A | 4/1998 | Flick | |
| 5,793,283 A | 8/1998 | Davis | |
| 6,028,506 A | 2/2000 | Xiao | |
| D453,148 S | 1/2002 | Alexander et al. | |
| 6,408,232 B1 | 6/2002 | Cannon et al. | |
| 6,556,135 B2* | 4/2003 | Attring et al. | 340/539.1 |
| 7,167,083 B2* | 1/2007 | Giles | 340/426.15 |
| D539,255 S | 3/2007 | Lheem | |
| 7,319,378 B1 | 1/2008 | Thompson et al. | |
| 2006/0089185 A1 | 4/2006 | Han | |
| 2006/0192659 A1 | 8/2006 | Fazio | |

* cited by examiner

*Primary Examiner* — Donnie Crosland

(57) ABSTRACT

A car alert device featuring a microprocessor operatively connected to a transmitter; a body controller operatively connected to the microprocessor, the body controller is configured to detect if a window is open, if an interior light is on, if the headlights are on, if a door is unlocked, or if the alarm system is activated; wherein the microprocessor is configured to receive input signals from the body controller when the body controller detects the window is open or the interior light is on or the headlights are on or the door is unlocked or the alarm system is activated, wherein upon receipt of the input signals the microprocessor sends output commands to the transmitter to cause the transmitter to send alert messages to the cellular phone of the user.

15 Claims, 3 Drawing Sheets

CAR ALERT DEVICE

FIELD OF THE INVENTION

The present invention is directed to a device for alerting a car owner of a problem with his/her vehicle, for example if the windows are left down or the doors have been unlocked.

BACKGROUND OF THE INVENTION

Vehicle tampering and theft is unfortunately an extremely common problem. The present invention features a car alert device for alerting a car owner if there is a problem with his/her vehicle, for example if he/she left the windows down or if the doors are left unlocked. The car alert device may help to prevent tampering or theft of the vehicle.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features car alert device. The car alert device comprises a housing for installing in a vehicle; a microprocessor disposed in the housing, the microprocessor is operatively connected to a transmitter; a body controller operatively connected to the microprocessor, the body controller is operatively connected to a window of the vehicle, to an interior light of the vehicle, to a headlight of the vehicle, to a door lock of the vehicle, and to an alarm system of the vehicle, the body controller is configured to detect if the window is open, if the interior light is on, if the headlight is on, if the door lock is unlocked, or if the alarm system is activated; wherein the microprocessor is configured to: (i) receive a first input signal from the body controller when the body controller detects that the window is open, wherein upon receipt of the first input signal the microprocessor sends a first output command to the transmitter to cause the transmitter to send a first alert message to a cellular phone of the user; (ii) receive a second input signal from the body controller when the body controller detects that the interior light is on, wherein upon receipt of the second input signal the microprocessor sends a second output command to the transmitter to cause the transmitter to send a second alert message to the cellular phone of the user; (iii) receive a third input signal from the body controller when the body controller detects that the headlight is on wherein upon receipt of the third input signal the microprocessor sends a third output command to the transmitter to cause the transmitter to send a third alert message to the cellular phone of the user; (iv) receive a fourth input signal from the body controller when the body controller detects that the door lock is unlocked, wherein upon receipt of the fourth input signal the microprocessor sends a fourth output command to the transmitter to cause the transmitter to send a fourth alert message to the cellular phone of the user; and (v) receive a fifth input signal from the body controller when the body controller detects that the alarm system is activated, wherein upon receipt of the fifth input signal the microprocessor sends a fifth output command to the transmitter to cause the transmitter to send a fifth alert message to the cellular phone of the user; wherein the a phone number of the cellular phone is pre-programmable into the device.

In some embodiments, the housing can be installed inside the vehicle via a mounting bracket. In some embodiments, the microprocessor is operatively connected to the transmitter via an encoder. In some embodiments, the device is operatively connected to a power source. In some embodiments, the power source is an electrical system of the vehicle. In some embodiments, the car alert device further comprises a numeric keypad operatively connected to the microprocessor, the numeric keypad functions to allow the user to program the phone number into the device. In some embodiments, the phone number is stored in a storage medium operatively connected to the microprocessor. In some embodiments, the storage medium is read-only memory or flash memory.

In some embodiments, the first alert message is "a window is down." In some embodiments, the second alert message is "an interior light is on." In some embodiments, the third alert message is "headlights are on." In some embodiments, the fourth alert message is "a door is unlocked." In some embodiments, the fifth alert message is "the alarm system is activated." In some embodiments, the device is activated after a certain length of time following deactivation of the vehicle. In some embodiments, the certain length of time is about 2 minutes, about 5 minutes, or about 10 minutes.

DESCRIPTION OF PREFERRED EMBODIMENTS

Figure 1:
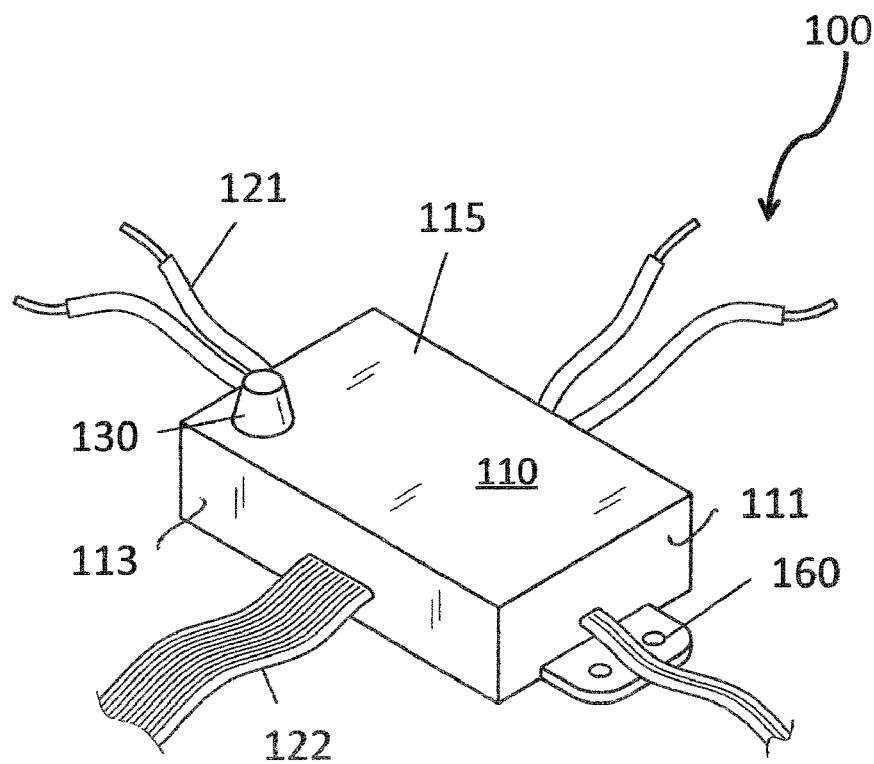
FIG. 1 is a perspective view of the car alert device of the present invention.
Figure 2:
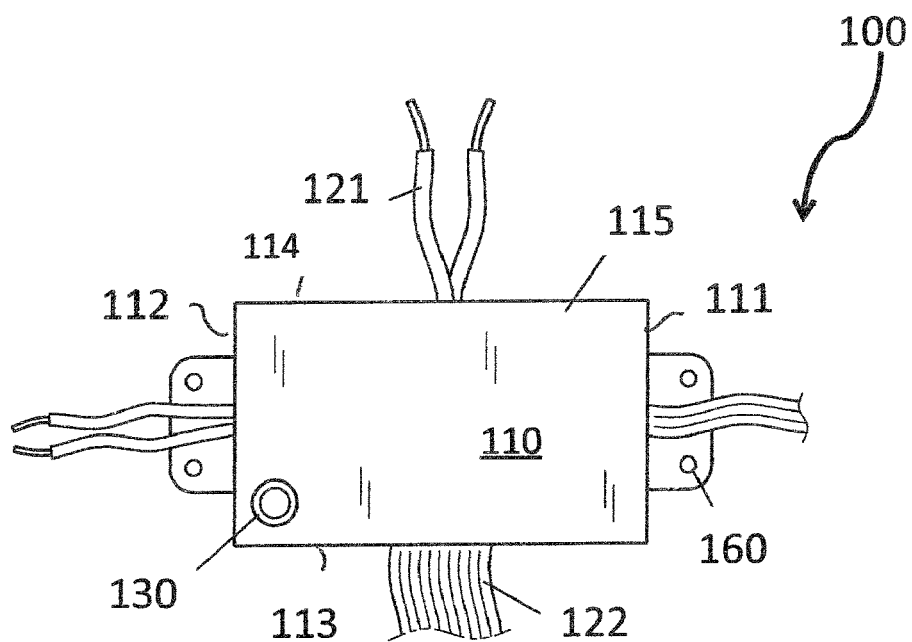
FIG. 2 is a top view of the car alert device of FIG. 1.
Figure 3:
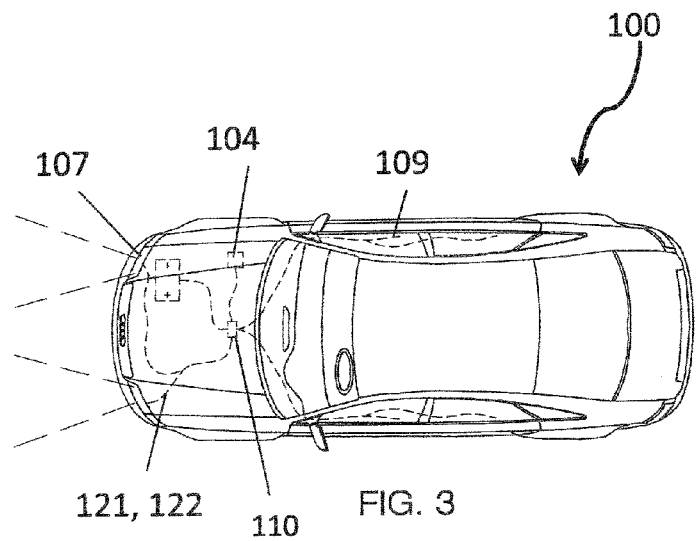
FIG. 3 is a top view of the car alert device of FIG. 1 as installed in a car.
Figure 4:
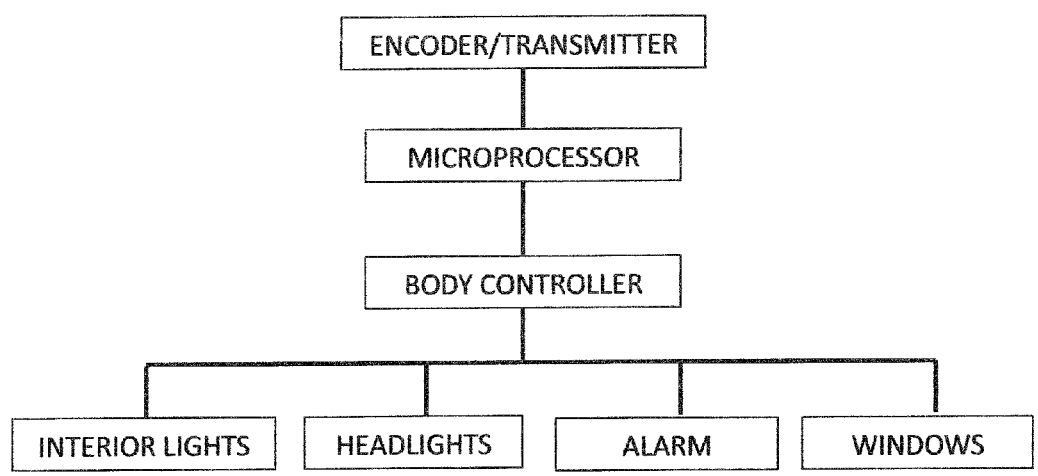
FIG. 4 is a schematic representation of the electrical components of the car alert device of the present invention.
Figure 5:
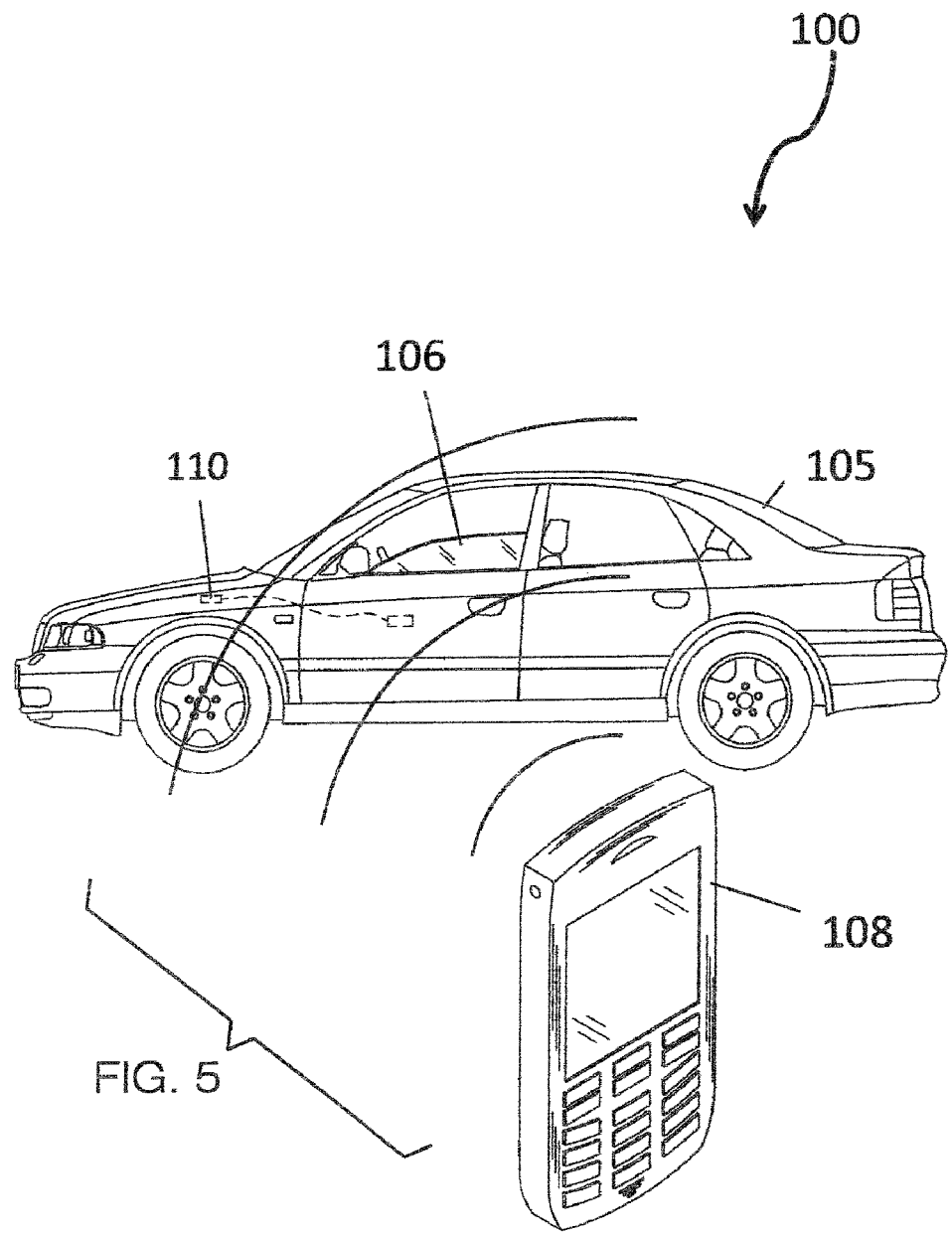
FIG. 5 is a side view of the car alert device of the present invention as installed in a car.

Referring now to FIGS. 1-5, the present invention features a car alert device 100 for alerting a car owner of a problem with his/her car 105, for example if the windows 106 are left down, the door locks 109 are unlocked, if interior lights have been left on, if the car alarm 104 has been activated, and/or if the headlights 107 are left on.

The car alert device 100 of the present invention comprises a housing 110 that can be installed in a vehicle. In some embodiments, the housing 110 has an inner cavity, a first side 111, a second side 112, a third side 113, a fourth side 114, a top surface 115, and a bottom surface 116. The housing 110 can be attached inside the vehicle via an attachment means, for example a mounting bracket 160. The present invention is not limited to mounting brackets.

Disposed in the housing 110 is a microprocessor operatively connected to a body controller. The microprocessor may be further operatively connected to an encoder, the encoder being operatively connected to a transmitter (in some embodiments, the microprocessor is operatively connected to the transmitter). Body controllers are well known to one of ordinary skill in the art. The body controller of the present invention is a device configured to detect issues (e.g., problems) in the vehicle after the driver has left the vehicle, for example for detecting if a window is left down, if an interior light is left on, if the headlights are left on, if a door is unlocked, or if the alarm system of the vehicle becomes activated. The body controller is operatively connected to the headlights of the vehicle, to the alarm system of the vehicle, to the door locks of the vehicle, to the interior lights of the vehicle, and to the windows of the vehicle.

In some embodiments, the body controller is configured to send a main alert input signal to the microprocessor when the body controller detects that a window is left down, an interior light is left on, the headlights are left on, a door is unlocked, or the alarm system of the vehicle becomes activated (e.g., after the driver has left the vehicle). In some embodiments, upon receipt of the main alert input signal, the microprocessor is configured to send a main alert output command to the encoder and the transmitter. The encoder may convert the digital main alert output command of the microprocessor to a general alert message (e.g., frequency) that the transmitter can send as a text message or a voice message to the driver's cellular phone (the phone number being pre-programmed). In some embodiments, the general alert message may include a message such as "there is a problem with your vehicle."

In some embodiments, the body controller is configured to send a first input signal to the microprocessor when the body controller detects that a window is left down, a second input signal to the microprocessor when the body controller detects that an interior light is left on, a third input signal to the microprocessor when the body controller detects that the headlights are left on, a fourth input signal to the microprocessor when the body controller detects that a door is left unlocked, or a fifth input signal to the microprocessor when the body controller detects that the alarm system of the vehicle becomes activated.

In some embodiments, upon receipt of the first input signal, the microprocessor is configured to send a first output command to the encoder and the transmitter. The encoder may convert the digital first output command of the microprocessor to a first alert message that the transmitter can send as a text message or a voice message to the driver's cellular phone (the phone number being pre-programmed). In some embodiments, the first alert message may include a message such as "a window is down."

In some embodiments, upon receipt of the second input signal, the microprocessor is configured to send a second output command to the encoder and the transmitter. The encoder may convert the digital second output command of the microprocessor to a second alert message that the transmitter can send as a text message or a voice message to the driver's cellular phone (the phone number being pre-programmed). In some embodiments, the second alert message may include a message such as "an interior light is on."

In some embodiments, upon receipt of the third input signal, the microprocessor is configured to send a third output command to the encoder and the transmitter. The encoder may convert the digital third output command of the microprocessor to a third alert message that the transmitter can send as a text message or a voice message to the driver's cellular phone (the phone number being pre-programmed). In some embodiments, the third alert message may include a message such as "headlights are on."

In some embodiments, upon receipt of the fourth input signal, the microprocessor is configured to send a fourth output command to the encoder and the transmitter. The encoder may convert the digital fourth output command of the microprocessor to a fourth alert message that the transmitter can send as a text message or a voice message to the driver's cellular phone (the phone number being pre-programmed). In some embodiments, the fourth alert message may include a message such as "a door is unlocked."

In some embodiments, upon receipt of the fifth input signal, the microprocessor is configured to send a fifth output command to the encoder and the transmitter. The encoder may convert the digital fifth output command of the microprocessor to a fifth alert message that the transmitter can send as a text message or a voice message to the driver's cellular phone (the phone number being pre-programmed). In some embodiments, the fifth alert message may include a message such as "the alarm system is activated."

In some embodiments, the text or voice message is sent via the cellular network of the driver's cell phone or via an independent frequency, for example licensed by the FCC or Industry Canada. The present invention is not limited to the aforementioned examples of transmitting messages to the driver.

In some embodiments, the body controller or the microprocessor can monitor the windows via a switch mechanism. For example, a plunger-type switch is operatively connected to each window. The switch can move between a first position when the window is closed and a second position when the window is open (not closed). The microprocessor of the body controller can detect when the switch is in the second position. In some embodiments, the body controller or the microprocessor can monitor the headlights via a switch mechanism (e.g., with wire, relays, etc.) or the interior lights via a switch mechanism (e.g., with wire, relays, etc.). In some embodiments, the microprocessor or the body controller is operatively connected to the control unit in the vehicle's alarm system.

The device 100 of the present invention (e.g., the microprocessor, the body controller, the encoder, the transmitter, etc.) is operatively connected to a power source. The power source may include a battery and/or an electrical system of the vehicle 105. In some embodiments, an antenna 130 is disposed on the housing 110 (and operatively connected to the transmitter) for sending the messages (e.g., text or voice messages) to the mobile phone 108.

The encoder and/or the microprocessor may be connected to the transmitter in the housing 110 via wire components, for example a first wire component 121 or a second wire component 122. In some embodiments, the first wire component 121 and/or second wire component 122 is connected to the housing 110 via the first side 111, second side 112, third side 113, and/or fourth side 114.

The device 100 of the present invention further comprises a numeric keypad operatively connected to the microprocessor. Numeric keypads are well known to one of ordinary skill in the art. The user can enter his/her cell phone number into the numeric keypad, and the cell phone number is stored via the microprocessor (and/or a storage medium such as ROM, flash memory, etc.).

In some embodiments, the device 100 of the present invention is operatively connected to the vehicles ignition 12 volt circuit. When the user parks turns off the ignition the device 100 detects a lack of voltage (e.g., zero-volt signal) and becomes active after a certain length of time (e.g., 2 minutes, 5 minutes, 10 minutes) with the use of real time computing. In some embodiments, the user activates the system when leaving the vehicle.

The following the disclosures of the following U.S. Patents are incorporated in their entirety by reference herein: U.S. Pat. No. 6,408,232; U.S. Pat. No. 5,793,283; U.S. Pat. No. 6,028,506; U.S. Pat. No. 5,739,748; U.S. Pat. No. 7,319,378; U.S. Pat. Application No. 2006/0089185; U.S. Pat. Application No. 2006/0192659.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A car alert device comprising:
   (a) a housing for installing in a vehicle;
   (b) a microprocessor disposed in the housing, the microprocessor is operatively connected to a transmitter and an encoder;
   (c) a body controller operatively connected to the microprocessor, the body controller is operatively connected to a window of the vehicle, to an interior light of the vehicle, to a headlight of the vehicle, to a door lock of the vehicle, and to an alarm system of the vehicle, the body controller is configured to detect if the window is open, if the interior light is on, if the headlight is on, if the door lock is unlocked, or if the alarm system is activated;
   wherein the microprocessor is configured to receive any of five separate input signals from the body controller, and the microprocessor is configured to transmit any of five separate output commands to the transmitter and the encoder; wherein the encoder may convert each output command to a distinct alert message corresponding to the output command; wherein the transmitter can send any of five distinct alert messages generated by the encoder; wherein the microprocessor is configured to:
   (i) receive a first input signal from the body controller when the body controller detects that the window is open, wherein upon receipt of the first input signal the microprocessor sends a first output command to the transmitter and encoder, wherein the encoder may convert the first output command to a first alert message, wherein the transmitter may then send a first alert message to a cellular phone of the user;
   (ii) receive a second input signal from the body controller when the body controller detects that the interior light is on, wherein upon receipt of the second input signal the microprocessor sends a second output command to the transmitter and encoder, wherein the encoder may convert the second output command to a second alert message, wherein the transmitter may then send a second alert message to the cellular phone of the user;
   (iii) receive a third input signal from the body controller when the body controller detects that the headlight is on wherein upon receipt of the third input signal the microprocessor sends a third output command to the transmitter and encoder, wherein the encoder may convert the third output command to a third alert message, wherein the transmitter may then send a third alert message to the cellular phone of the user;
   (iv) receive a fourth input signal from the body controller when the body controller detects that the door lock is unlocked, wherein upon receipt of the fourth input signal the microprocessor sends a fourth output command to the transmitter and encoder, wherein the encoder may convert the fourth output command to a fourth alert message, wherein the transmitter may then send a fourth alert message to the cellular phone of the user; and
   (v) receive a fifth input signal from the body controller when the body controller detects that the alarm system is activated, wherein upon receipt of the fifth input signal the microprocessor sends a fifth output command to the transmitter and encoder, wherein the encoder may convert the fifth output command to a fifth alert message, wherein the transmitter may then send a fifth alert message to the cellular phone of the user;
   wherein the a phone number of the cellular phone is pre-programmable into the device.

2. The car alert device of claim 1, wherein the housing can be installed inside the vehicle via a mounting bracket.

3. The car alert device of claim 1, wherein the microprocessor is operatively connected to the transmitter via an encoder.

4. The car alert device of claim 1, wherein the device is operatively connected to a power source.

5. The car alert device of claim 4, wherein the power source is an electrical system of the vehicle.

6. The car alert device of claim 1 further comprising a numeric keypad operatively connected to the microprocessor, the numeric keypad functions to allow the user to program the phone number into the device.

7. The car alert device of claim 6, wherein the phone number is stored in a storage medium operatively connected to the microprocessor.

8. The car alert device of claim 7, wherein the storage medium is read-only memory or flash memory.

9. The car alert device of claim 1, wherein the first alert message is "a window is down."

10. The car alert device of claim 1, wherein the second alert message is "an interior light is on."

11. The car alert device of claim 1, wherein the third alert message is "headlights are on."

12. The car alert device of claim 1, wherein the fourth alert message is "a door is unlocked."

13. The car alert device of claim 1, wherein the e fifth alert message is "the alarm system is activated."

14. The car alert device of claim 1, wherein the device is activated after a certain length of time following deactivation of the vehicle.

15. The car alert device of claim 14, wherein the certain length of time is about 2 minutes, about 5 minutes, or about 10 minutes.

* * * * *